George H. Ashton,
Robert C. Mueller,
Inventors.
Koenig and Pope,
Attorneys.

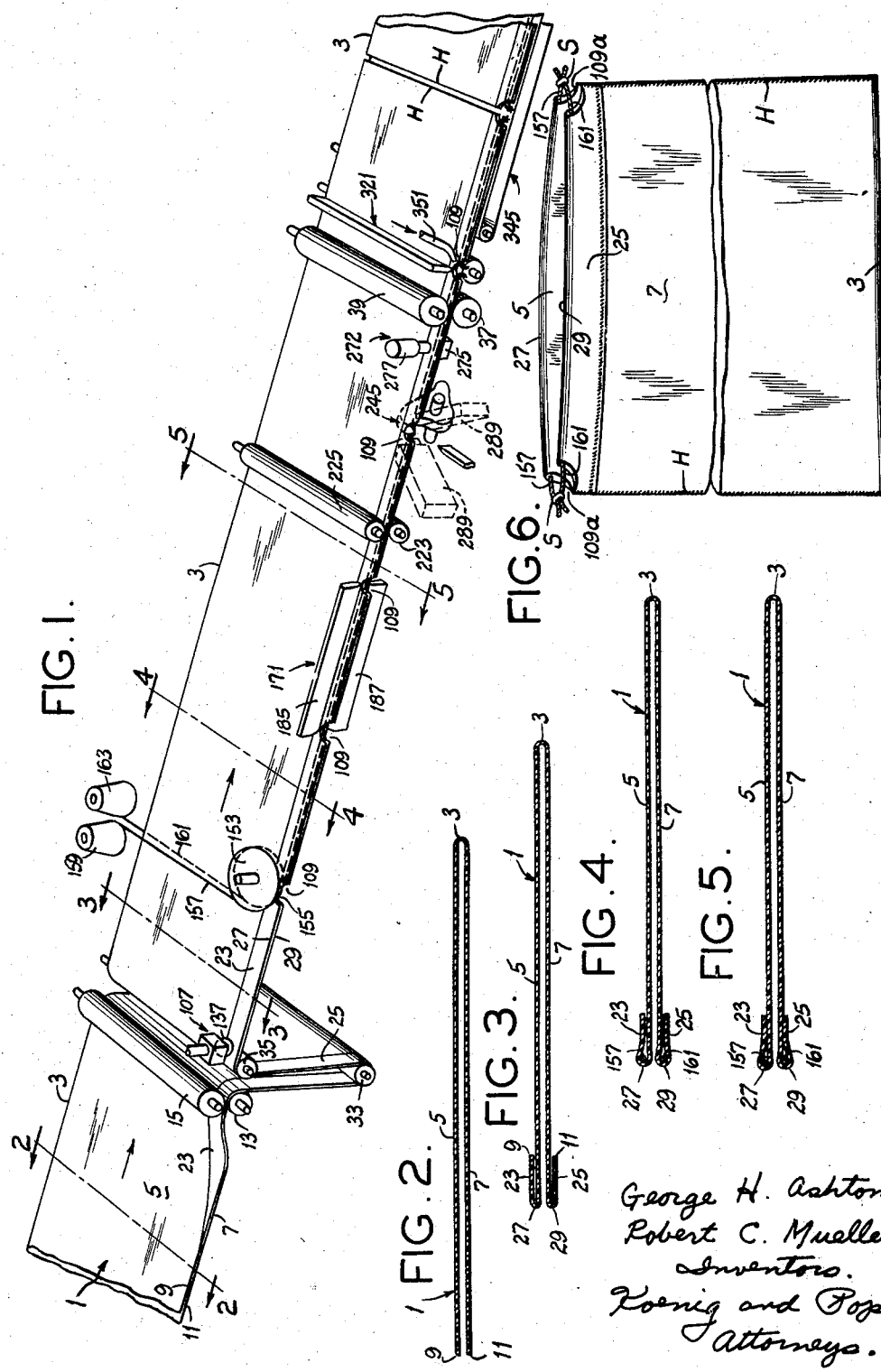

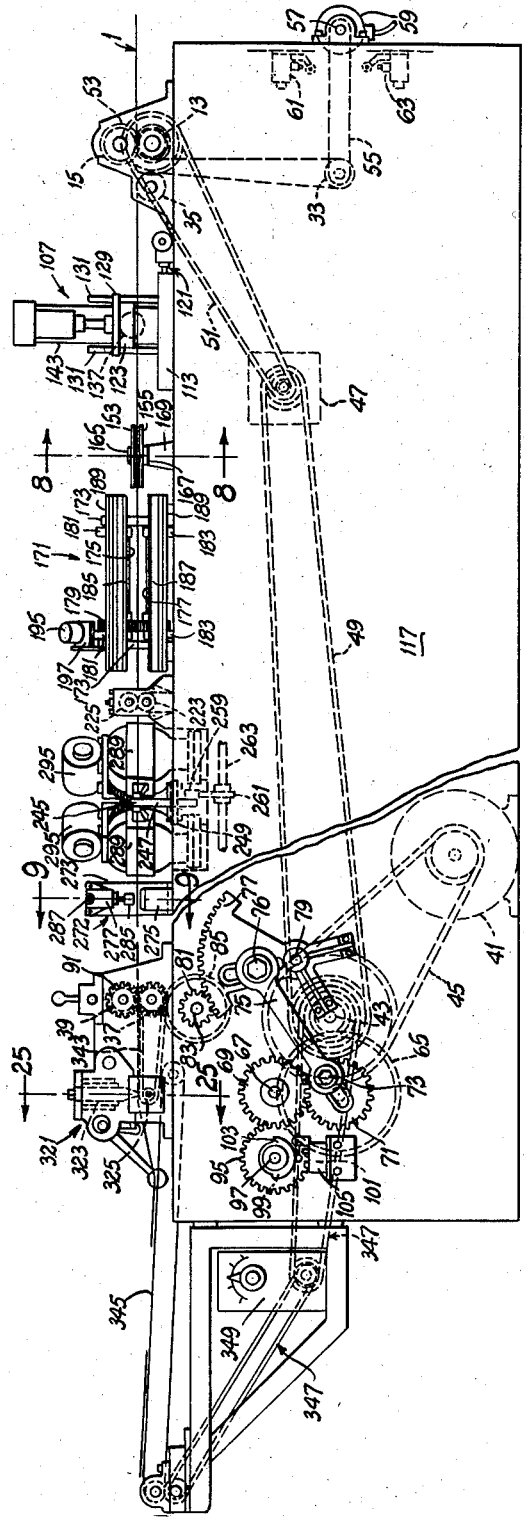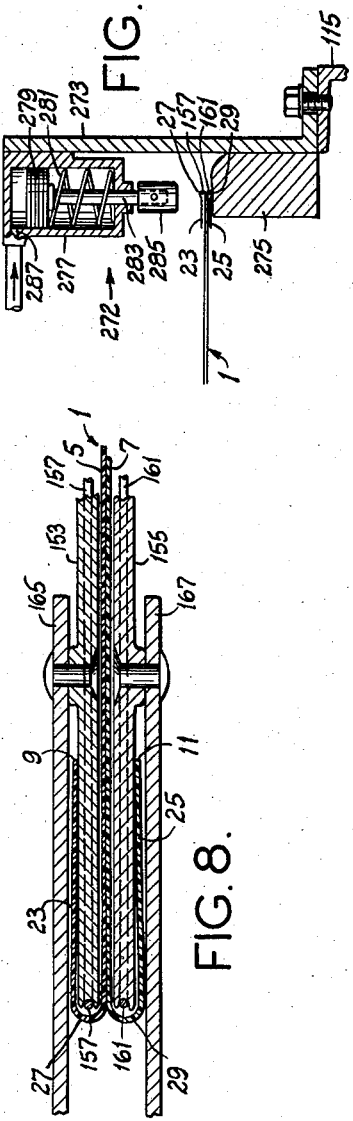

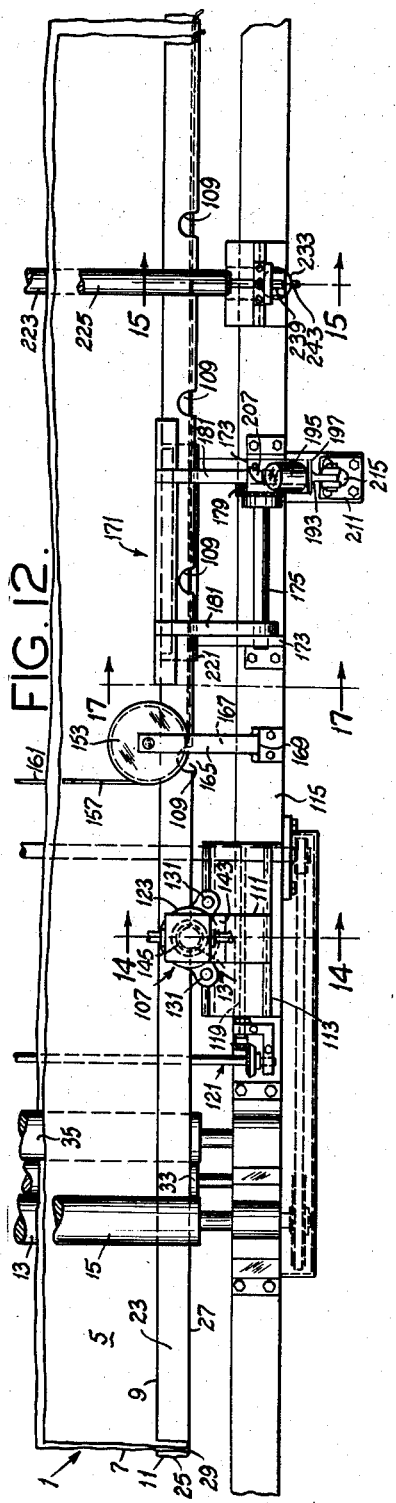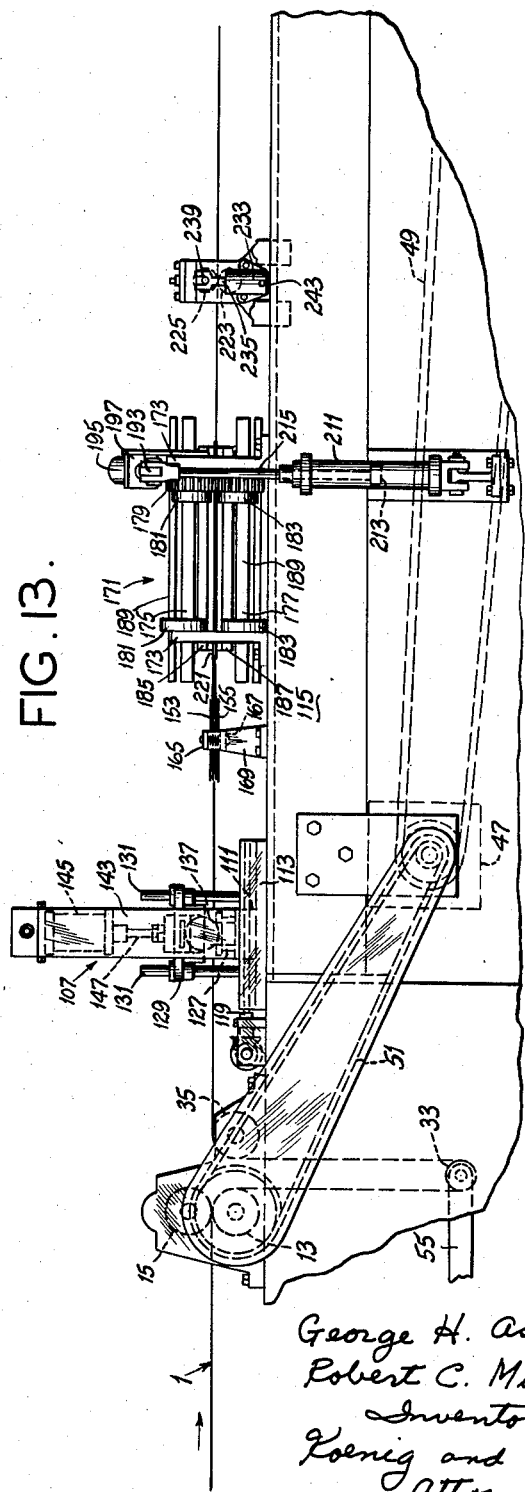

Aug. 4, 1959 G. H. ASHTON ET AL 2,897,729
APPARATUS FOR THE MANUFACTURE OF DRAW CORD BAGS
Filed Oct. 5, 1955 9 Sheets-Sheet 5
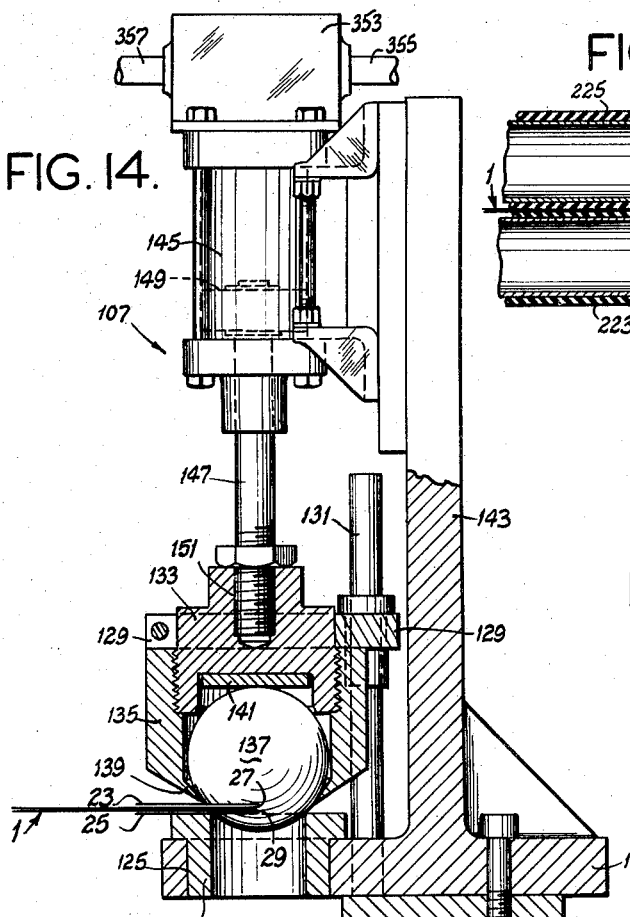
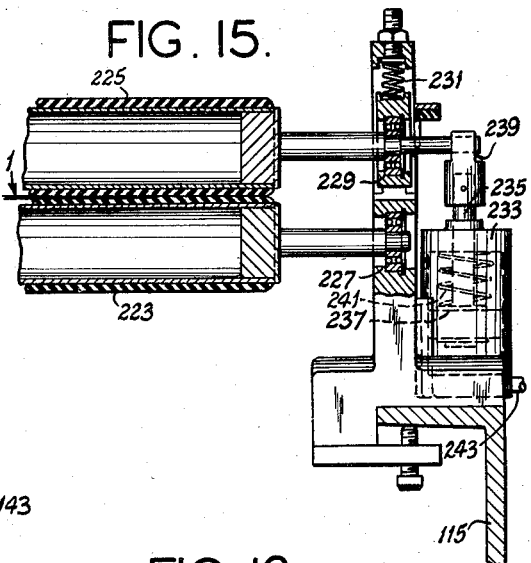
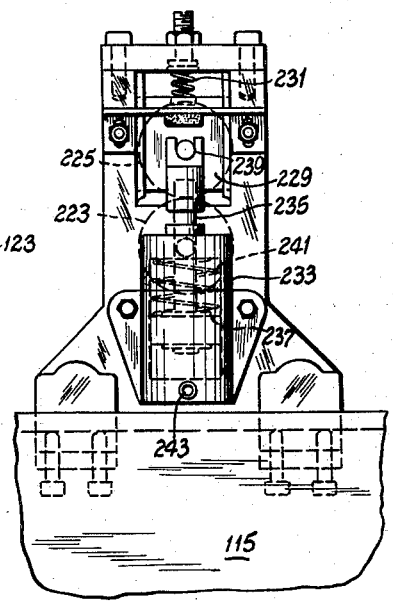
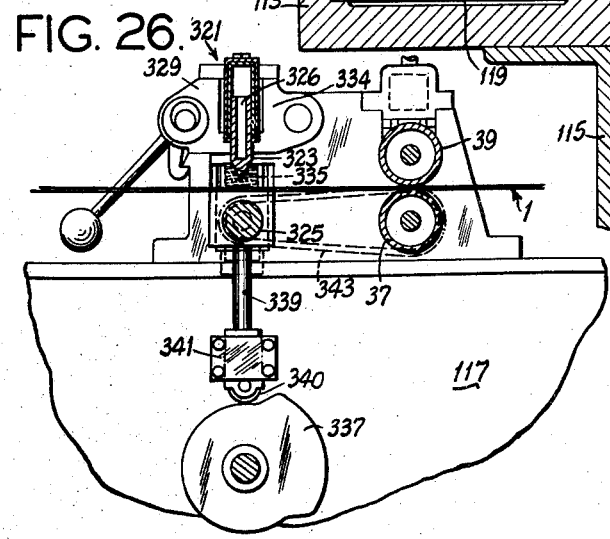
George H. Ashton,
Robert C. Mueller,
Inventors.
Koenig and Pope,
Attorneys.

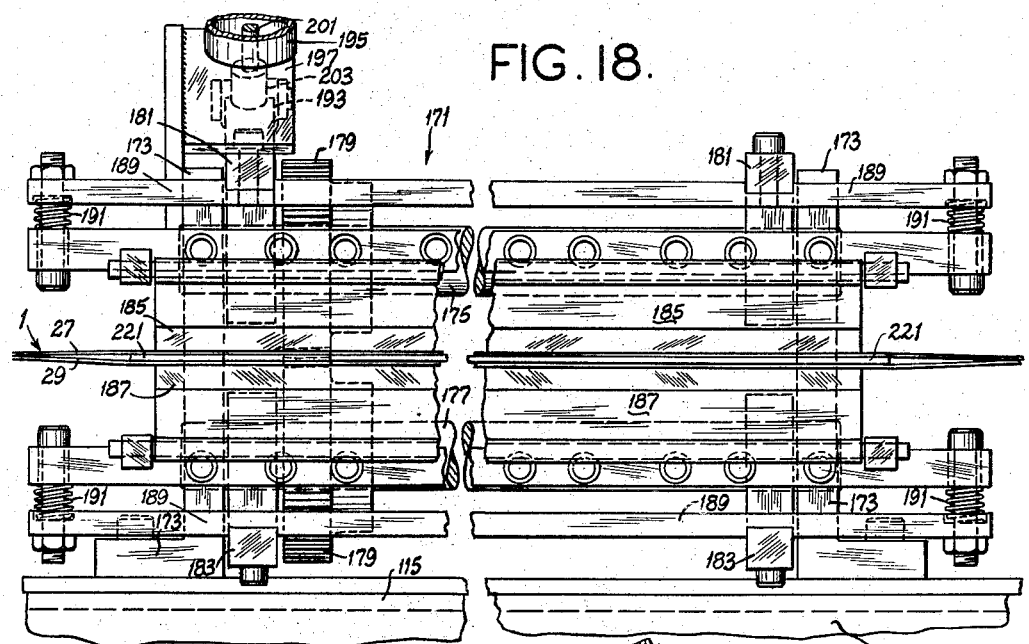
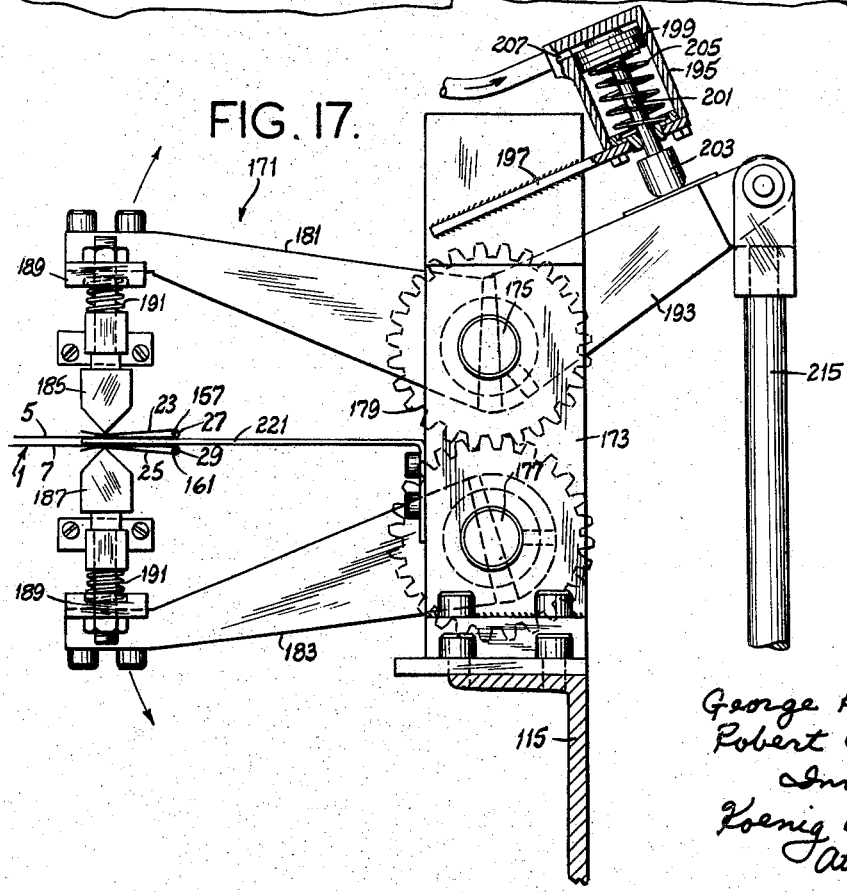

Aug. 4, 1959 G. H. ASHTON ET AL 2,897,729
APPARATUS FOR THE MANUFACTURE OF DRAW CORD BAGS
Filed Oct. 5, 1955 9 Sheets-Sheet 8
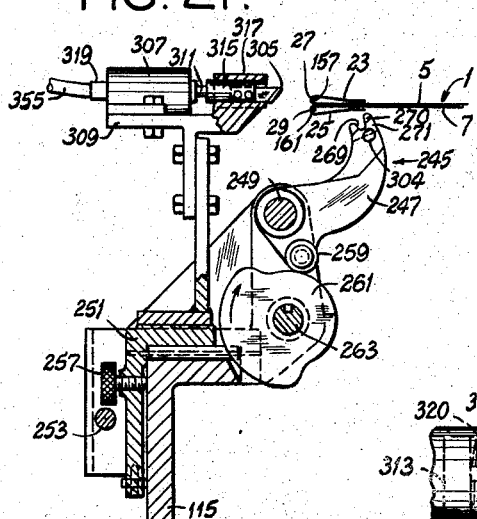
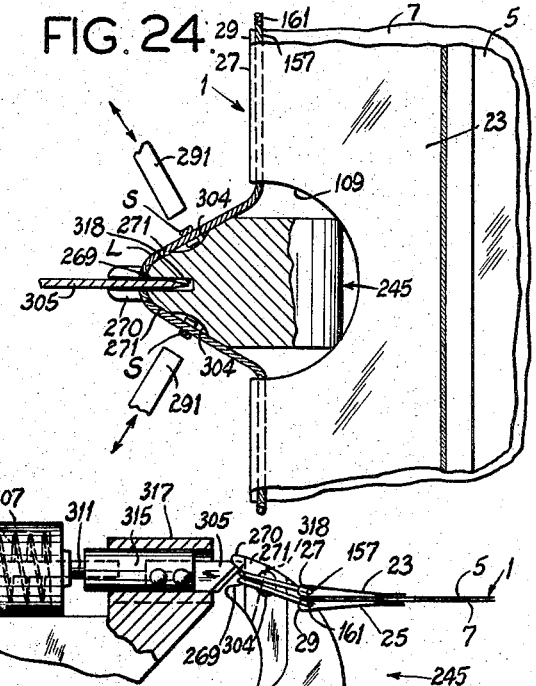
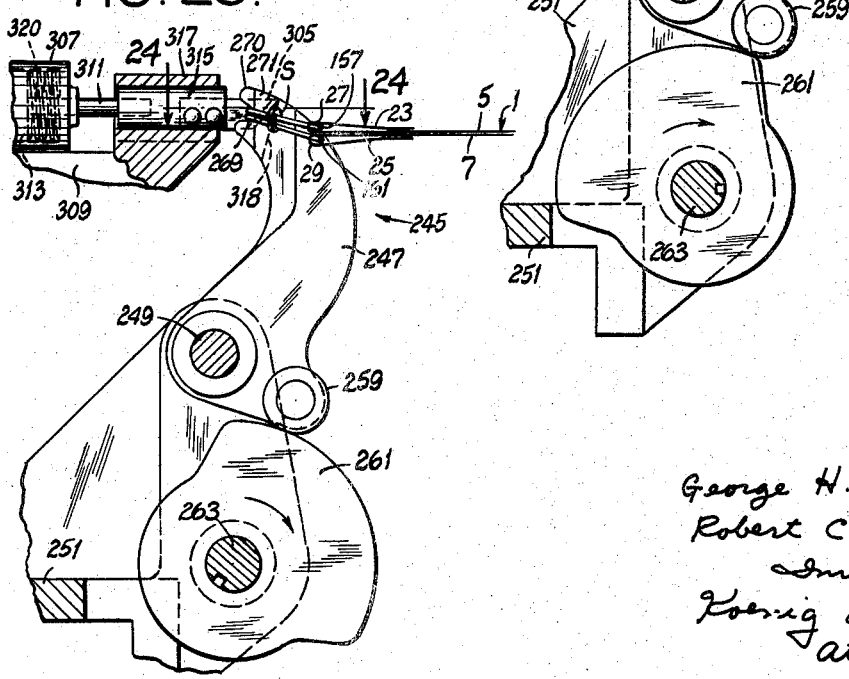
George H. Ashton,
Robert C. Mueller,
Inventors.
Koenig and Pope,
Attorneys.

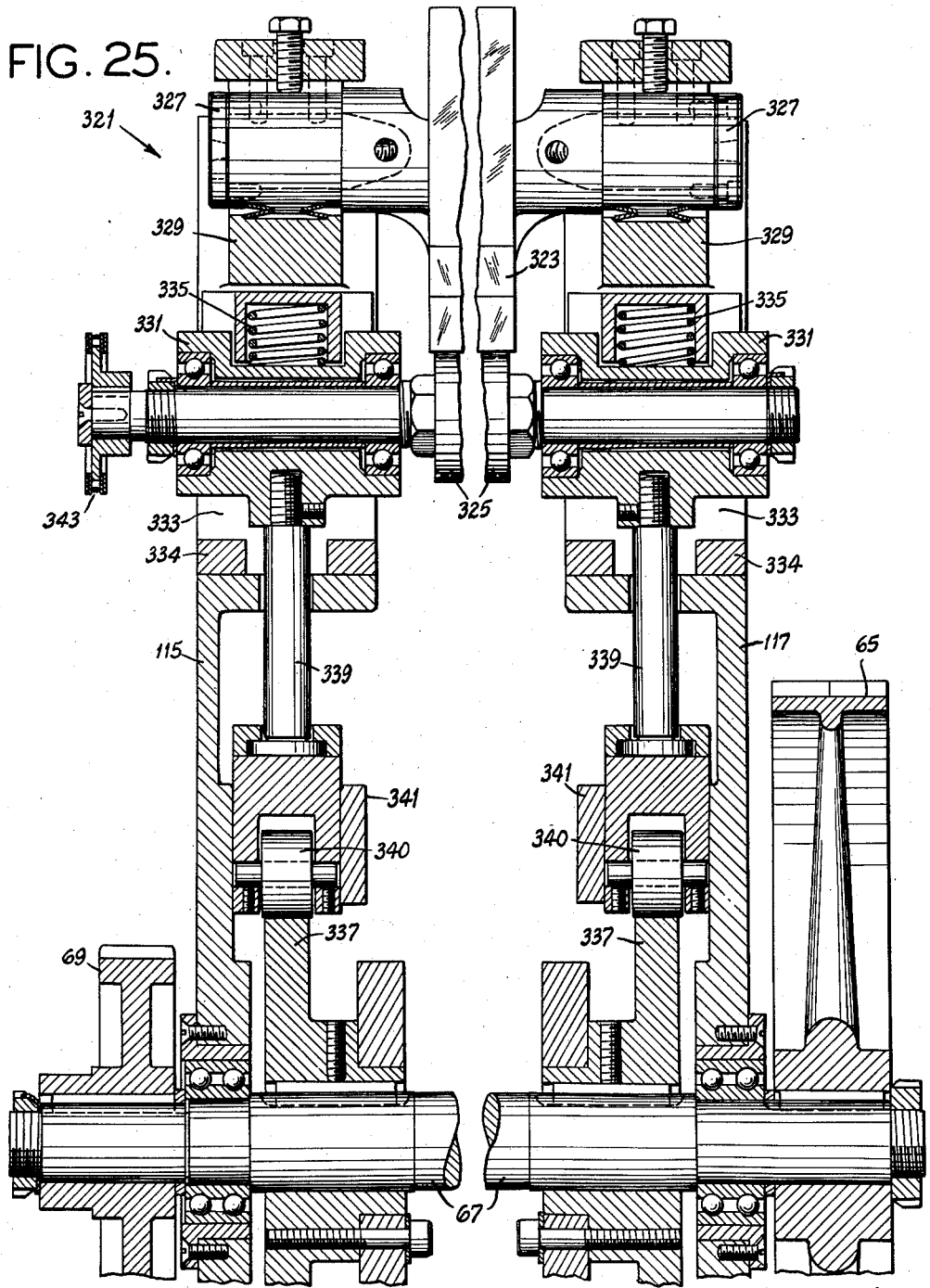

United States Patent Office 2,897,729
Patented Aug. 4, 1959

2,897,729

APPARATUS FOR THE MANUFACTURE OF DRAW CORD BAGS

George H. Ashton, Sappington, and Robert C. Mueller, Affton, Mo., assignors to Bemis Bro. Bag Company, St. Louis, Mo., a corporation of Missouri Application October 5, 1955, Serial No. 538,647

25 Claims. (Cl. 93—8)

This invention relates to apparatus for the manufacture of draw cord bags, and more particularly to apparatus for the manufacture of heat-sealable plastic bags with textile draw cords.

Among the several objects of the invention may be noted the provision of apparatus for manufacturing bags from heat-sealable sheet plastic material, such as polyethylene, with textile draw cords; the provision of apparatus of the class described for economically manufacturing such bags in quantity production with the bags having heat-sealed seams on both sides and heat-sealed hems containing the draw cords; the provision of apparatus of the class described for manufacturing the bags with the ends of the draw cords secured together as by stapling; and the provision of apparatus of the class described wherein stapling of the ends of the draw cords is effected automatically. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a perspective view illustrating generally diagrammatically the basic features of the apparatus of the invention as viewed from one side of the apparatus;

Figs. 2–5 are transverse sections taken on lines 2—2, 3—3, 4—4 and 5—5, respectively, of Fig. 1, the thickness of the sheet plastic material shown therein being exaggerated;

Fig. 6 is a perspective view illustrating a completed bag;

Fig. 7 is a view in elevation of the apparatus as viewed from the other side, partly broken away;

Fig. 8 is an enlarged vertical section taken on line 8—8 of Fig. 7 illustrating certain cord guiding means;

Fig. 9 is an enlarged vertical section taken on line 9—9 of Fig. 7, illustrating a cord clamping means;

Fig. 12 is a plan view of a portion of the apparatus;

Fig. 13 is a side elevation of the portion of the apparatus shown in Fig. 12;

Figure 19:
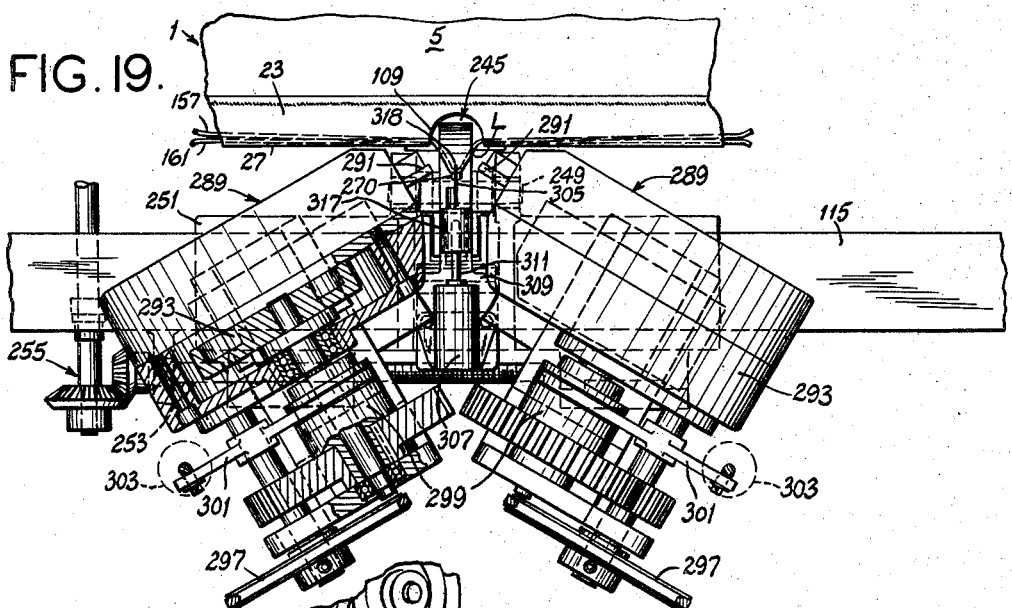
Figure 20:
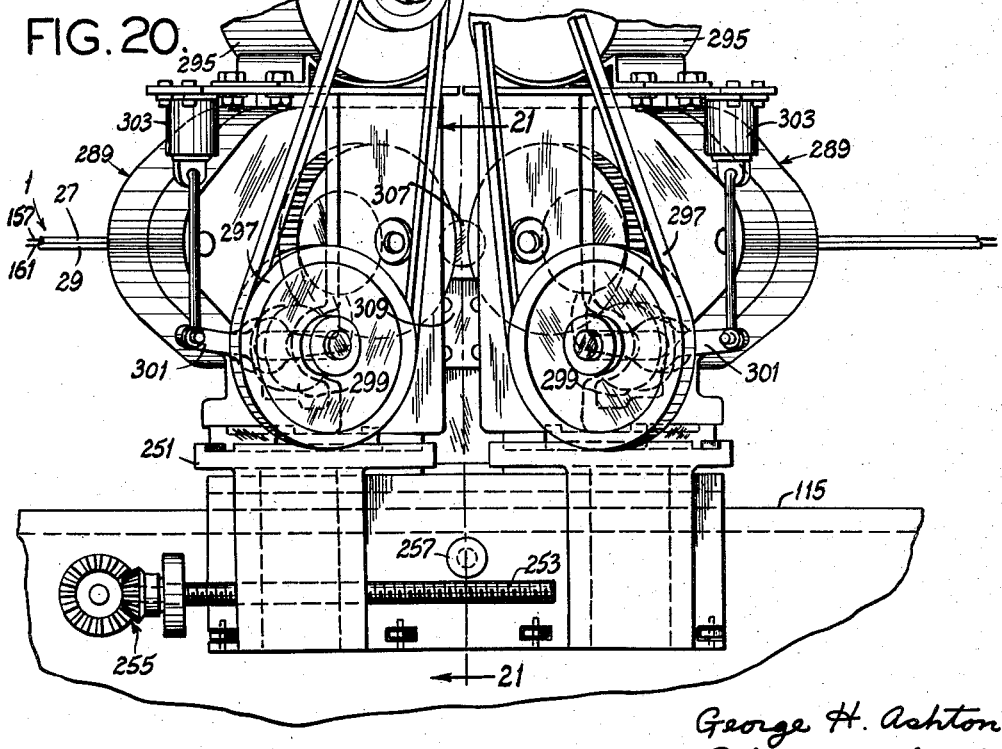

Figs. 14 and 15 are enlarged vertical transverse sections taken on lines 14—14 and 15—15, respectively, of Fig. 12;

Fig. 16 is a right end view of Fig. 15;

Fig. 17 is an end view of a hem-sealing means, taken on line 17—17 of Fig. 12 and illustrating an air cylinder in section;

Fig. 18 is an elevation of Fig. 17 as viewed from the left, with parts broken away;

Fig. 19 is a plan view illustrating certain stapling means of the apparatus, parts being broken away and shown in section;

Fig. 20 is a view in elevation of the stapling means shown in Fig. 19;

Fig. 21 is a vertical section on a reduced scale taken on line 21—21 of Fig. 20, parts in the background being omitted;

Fig. 22 is an enlargement of part of Fig. 21, illustrating a moved position of parts;

Fig. 23 is a view similar to Fig. 22 showing a further moved position of parts;

Fig. 24 is an enlarged section taken on line 24—24 of Fig. 23;

Fig. 25 is an enlarged vertical section taken on line 25—25 of Fig. 7; and,

Fig. 26 is an enlarged vertical longitudinal section of part of Fig. 7.

Corresponding reference characters indicate corresponding parts throughout the several views of the drawings.

Referring to the drawings, first more particularly to Figs. 1–5, there is indicated at 1 a continuous web of heat-saelable sheet plastic material such as polyethylene. The web is shown as folded along a longitudinal fold line 3 (see Fig. 2) so that it has two superimposed walls 5 and 7 joined along one longitudinal edge by the integral longitudinal fold at 3. The walls 5 and 7 have their other edges 9 and 11 free and in superimposed relation. The folded web 1 may be supplied in its folded condition from a roll, or by withdrawing a flat web from a roll and folding it, or by withdrawing flat tubing from a roll and slitting it along one edge. The folded web 1 is continuously fed forward by a pair of continuously driven feed rolls 13 and 15. Prior to travel of the web between these feed rolls, marginal portions 23 and 25 of the walls 5 and 7 of the web are folded back on longitudinal fold lines 27 and 29 adjacent the free edges 9 and 11 of the walls to form open hem portions on the outside of the walls 5 and 7 (see Fig. 3). This folding may be accomplished by using any suitable conventional folding means (not shown).

After leaving the feed rolls 13, 15 the web 1, now having the open hem portions 23 and 25, travels down and around a dancer roll 33 (see Figs. 1, 7, 10, 12 and 13), thence up and around an idler guide roll 35, and thence horizontally to a pair of intermittently driven feed rolls 37 and 39 (see Figs. 1, 7, 10 and 26). An electric motor for driving the rolls 13, 15 and the rolls 37, 39 is indicated at 41 (see Figs. 7 and 10). This motor drives a shaft 43 via a belt and pulley drive 45. Shaft 43 is connected to drive the input shaft of a variable speed hydraulic transmission 47 by a chain and sprocket drive 49. The output shaft of transmission 47 is connected to the roll 13 by a chain and sprocket drive 51. Rolls 13 and 15 are geared together as indicated at 53. The dancer roll 33 is carried by a pivoted frame 55. This frame is pivotally mounted by being fixed to a horizontal shaft 57 equipped with an electric brake 59. Upper and lower limit switches for operation by the dancer roll frame are indicated at 61 and 63. The transmission 47 is a well-known commercially available type having electrical means for varying the speed of its output shaft relative to the speed of its input shaft. This means is under control of the limit switches 61 and 63 in such manner that when the frame swings upward far enough to actuate the upper switch 61, the speed of the rolls 13 and 15 is increased to provide more slack in the web, and when the frame swings far enough to actuate the lower switch 63, the speed of the rolls 13 and 15 is decreased to take slack out of the web.

Shaft 43 is geared as indicated at 65 to a cam shaft 67. A gear 69 on the shaft 67 meshes with a gear 71 carrying a crankpin 73 (see Fig. 7). This crankpin 73 may be made radially adjustable on the gear 71 by any suitable conventional means. A link 75 is connected at one end to the crankpin 73 and has its other end pin-connected at 76 to a sector gear 77. The sector gear 77 is pivoted at 79. The pin at 76 may be made radially adjustable on the sector gear by any suitable conventional means. The sector gear 77 meshes with a pinion 81 on a shaft 83. Shaft 83 carries a gear 85 in mesh with an input gear 87 for an electric clutch 89. This clutch when energized drives the roll 37. Rolls 37 and 39 are geared together as indicated at 91. The rolls are also subject to the braking action of an electric brake 93.

Gear 69 is in mesh with a gear 95 on an auxiliary cam shaft 97. Shaft 97 carries a cam 99 controlling a switch 101. This switch 101 controls the operation of the clutch 89. The cam 99 is developed so that the switch 101 is closed and the clutch is energized during a fraction of a revolution of the cam shaft. The rolls 37 and 39 are positively driven during the interval of clutch energization to feed forward a length of the web 1 corresponding to the desired bag width. During the remainder of each revolution of the cam shaft, the clutch is deenergized so that the rolls 37 and 39 remain stationary to provide a dwell interval between successive feeding operations. The amount of material fed forward on each cycle may be varied by adjusting pins 73 and 76. The shaft 97 also carries a second cam 103 controlling a switch 105. This switch 105 controls the brake 93. The cam 103 is developed and so phased with respect to the other cam 99 on shaft 97 that the brake is applied when the clutch is deenergized to prevent over-running of the feed rolls. The brake, of course, is released when the clutch is energized.

As the web travels forward (to the right as viewed in Fig. 1 and to the left as viewed in Fig. 7) from the guide roll 35 to the intermittent feed rolls 37 and 39, it is acted upon by means indicated at 107 for forming a notch 109 in the margin of the web having the open hem portions 23 and 25. As will be made clear, this means operates during each dwell interval of the web (while the web is stationary) so as to form a series of notches 109 in the web, with these notches spaced at bag width intervals. As shown in detail in Figs. 12–14, this means comprises a base 111 slidable lengthwise of the apparatus in a guide 113 mounted on the side frame of the apparatus which is on the right as viewed in the direction of travel of the web. This side frame is designated 115. The left side frame is designated 117. Adjusting means for the base 111 is shown to include an adjusting screw 119 and means 121 for rotating the screw. The base 111 carries a plate 123 having a circular opening 125 receiving an annular anvil 127. The hemmed margin of the web travels over this anvil, as shown in Fig. 14.

A clamp ring 129 is slidable on a pair of posts 131 which extend upward from the plate 123. Clamped in this ring is a screw-threaded member 133 to which is attached a ball holder 135. A ball 137 is retained in the holder by means of a flange 139. A back-up disk for the ball is indicated at 141. The ball is of larger diameter than the opening in the anvil 127, and is adapted to punch a notch in the web upon downward movement of the ball into the opening in the anvil. A supporting plate 143 extends upward from the plate 123. Mounted on the plate 143 in an air cylinder 145. A piston rod 147 extends from the piston 149 of the air cylinder to a connection at 151 with the member 133.

Following the notch-forming means 107, there are two pulleys 153 and 155 for guiding a first cord 157 from a supply 159 thereof between the open hem portion 23 and the wall 5 of the web, and for guiding a second cord 161 from a supply 163 thereof between the other open hem portion 25 and the wall 7 of the web (see Figs. 1, 7, 8, 12 and 13). These pulleys 153 and 155 are rotary on a vertical axis, the pulley 153 being located above and the pulley 155 being located below the web. The pulley 153 extends between the hem portion 23 and the wall 5, and the pulley 155 extends between the hem portion 25 and the wall 7. The pulleys 153 and 155 are carried by upper and lower cantilever members 165 and 167 which extend laterally of the apparatus from a support 169 mounted on the side frame 115 of the apparatus. The cords 157 and 161 are trained around the pulleys to enter between the hem portions and the walls of the web. Fig. 4 shows the web with the cords in the open hem portions.

Following the cord guide pulleys 153 and 155, there is provided means designated in its entirety by reference character 171 for securing the margins of the open hem portions 23 and 25 to the respective walls 5 and 7 of the web by heat sealing, thereby to form complete tubular hems containing the cords. As shown in Figs. 7, 12, 13, 17 and 18, this hem-sealing means 171 comprises a pair of bearing members 173 mounted on the side frame 115. Members 173 support an upper shaft 175 and a lower shaft 177 extending longitudinally of the apparatus above the side frame 115. The shafts 175 and 177 are geared together as indicated at 179. Arms 181 extend radially inward from the upper shaft 75 and arms 183 extend radially inward from the lower shaft 177. At the inner ends of the arms 181 and 183 are mounted upper and lower sealing bars 185 and 187. Each of the bars has electrical heating means incorporated therein, and is yieldably mounted with respect to a backup bar 189 by means of springs 191.

A crank arm 193 extends radially outward from the upper shaft 175. A short air cylinder 195 is mounted above the arm 193 on a bracket 197 which is secured to the left-hand bearing member 173 as viewed in Fig. 18. The piston of the air cylinder 195 is indicated at 199 in Fig. 17. A piston rod 201 extends downward from the piston out of the cylinder and has a knob 203 engaging the upper side of the crank arm 193. The piston 199 and the rod 201 are biased to an upper retracted position by a return spring 205. The cylinder has an inlet port 207 at its upper end. Upon admission of air under pressure through the port 207, the piston 199 and the piston rod 201 are driven downward against the bias of the return spring 205, and this rocks arm 193 clockwise as viewed in Fig. 17 to effect separation of the sealing bars 185 and 187. Upon venting the upper end of the cylinder 195 through the port 207, the spring 205 returns the piston and the piston rod to their upper retracted position. When this occurs, the sealing bars 185 and 187 are moved toward one another by an air cylinder 211 to engage the hem portions 23 and 25 and effect sealing thereof to the walls 5 and 7 of the web 1.

Cylinder 211 is long in relation to cylinder 195 and has its piston 213 connected by a piston rod 215 to the outer end of the crank arm 193. The cylinder 211 has a port 217 at its lower end and a port 219 at its upper end (see Fig. 11). By supplying air under pressure below piston 213 through the lower port 217 and venting the upper end of cylinder 211 through the port 219 and venting the cylinder 195, the piston 213 and piston rod 215 are moved upward to move the sealing bars 185 and 187 toward one another and into sealing engagement with the web 1. The separation of the sealing bars effected by cylinder 195 is relatively small, but sufficient to allow the web to travel freely between the bars. The web 1 travels between the bars with its upper and lower walls separated by a plate 221 which extends inward from the bearing members 173. When the apparatus is stopped, air under pressure is admitted through port 219 above the piston of the cylinder 211 and the lower end of the cylinder 211 is vented through port 217, thereby widely to separate the sealing bars. The sealing of the hems by the bars 185 and 187 occurs during the dwell intervals of the web. Fig. 5 shows the web with the hems sealed.

Following the hem-sealing means 171 there is provided a pair of rubber-covered rolls 223, 225 for effecting gripping of the draw cords 157 and 161 to the web to insure feeding forward of the cords with the web. As shown in detail in Figs. 15 and 16, roll 223 is journalled in fixed bearings such as indicated at 227. The roll 225 is located above the roll 223 journalled at its right end in a slidable bearing 229 and at its left end in a self-aligning bearing (not shown). The bearing 229 is spring biased downward by a spring as indicated at 231. The upper roll 225 is adapted to be moved upward away from cooperative relation with the lower roll 223 by means of an air cylinder 233 having its piston rod 235 extending from its piston 237 and having a fork 239 at its upper end engageable with the right end of the upper roll. The piston 237 and rod 235 are biased downward by a spring 241. The cylinder has a lower port 243. The arrangement is such that when the air cylinder 233 is vented below the piston 237 via port 243, spring 231 biases the upper roll 225 downward toward the lower roll 223 so that the cords 157 and 161 are gripped within the hem portions 23 and 25 of the web to insure that the cords feed forward with the web.

Following the cord-gripping rolls 223 and 225, there is provided a unit 245 comprising means for gathering portions of the cords 157 and 161 which are exposed in a notch 109, for drawing a loop L including portions of both cords from the notch, for securing together by stapling the portions of the two cords in the loop at two points spaced along the length of the cords, and for severing the cords between the two points of securement. The unit 245, which is shown best in Figs. 19–23, includes a swinging arm 247 which serves both as a gathering arm and as a staple-clinching anvil. The arm is fixed on a shaft 249 which extends longitudinally of the apparatus, being carried by a bracket 251 slidable on the right side frame 115. Adjusting means for the bracket is shown to comprise an adjusting screw 253 and means 255 for rotating the screw. A clamp screw for the bracket is indicated at 257. The arm 247 carries a cam follower roller 259 engageable by a cam 261. This cam is splined on a shaft 263 supported in bearings 265 (see Fig. 10) carried by the side frame 115, the shaft extending longitudinally of the apparatus. The shaft 263 is driven from the shaft 67 at a one-to-one ratio by drive means such as indicated at 267. The bracket 251 is slidable with respect to the shaft 263, cam 261 remaining in engagement with the follower roller 259 in various positions of adjustment of the bracket.

The cam 261 is formed so that the arm 247 occupies the lowered, retracted position shown in Fig. 21 during a portion of a revolution of the cam, and is held in the raised position shown in Figs. 22 and 23 during another portion of a revolution. When the arm 247 is in its retracted position, its free end lies below the web 1. The cam is phased to swing the arm 247 from retracted position to raised position during each dwell interval of the web. The bracket 251 is so positioned relative to the web that each time the web comes to a stop, a notch 109 (formed by the means 107) is located in register with the arm 247. As the arm 247 is swung from its retracted position to its raised position by the cam 261, the upper end of the arm travels upward through the notch 109 and laterally outward, and acts to gather the cords 157 and 161 where they are exposed in the notch and to draw the loop L including portions of both cords outward beyond the edge of the web, as shown in Figs. 19 and 22–24. The arm 247 is formed with a recess 269 at its free end for receiving the cords. This recess is in a nose 270 at the free end of arm 247. The arm has flat cheeks 271 which converge toward the nose 270.

At 272 is indicated a clamping means for the cords 157 and 161 located between the unit 245 and the intermittent feed rolls 37 and 39. This clamping means (see Fig. 9) comprises a bracket 273 secured to the side frame 115 carrying a block 275 and a vertical air cylinder 277 above the block having a piston 279 biased upward by a spring 281. A piston rod 283 extends down from the piston out of the lower end of the cylinder and carries a presser foot 285 at its lower end. The hem portions 23 and 25 of the web 1 with the cords 157 and 161 therein travel over the block 275. The cylinder 277 has a port 287 at its upper end. By admitting air under pressure through the port 287 to the cylinder above the piston, the piston and piston rod are driven downward against the bias of the spring 281 so that the presser foot 285 clamps the cords against the block 275. This prevents rearward movement of the cords when acted upon by the arm 247, and permits the latter to draw out the loop, the excess material for the loop being drawn from the cord supplies 159 and 163.

The unit 245 includes two stapling machines, each designated 289, for stapling together the portions of the two cords in the loop L on opposite sides of the arm 247, using the latter as an anvil. The stapling machines are identical except that one is right-hand and the other left-hand, each being of a well-known, commercially available construction. In general, each machine includes a staple-driving plunger 291 and mechanism for operating the plunger indicated at 293. This mechanism is driven from an electric motor 295 via a belt and pulley drive 297 and a single-revolution clutch 299. Tripping means for the single-revolution clutch is indicated at 301. This means is under control of a solenoid 303. When the solenoid is energized, the tripping means is actuated to release the clutch for operation through a revolution. This results in driving of a staple. The two stapling machines 289 are arranged on opposite sides of the arm 247, with their staple-driving members 291 movable in planes at right angles to the cheeks 271 of the arm. Each cheek has a staple-clinching recess 304 (see Figs. 21, 22 and 24), the plungers acting in conjunction with these recesses to clinch staples around the cords when the arm 247 is in its raised position.

At 305 is indicated a knife for severing the cords between the two staples S. This knife is operated by an air cylinder 307. The cylinder 307 is carried by a shelf 309 mounted on the bracket 251. A piston rod 311 extends from the piston 313 of the cylinder to a connection at 315 with the knife. This connection 315 is guided for sliding movement in a sleeve 317 on the shelf 309. The nose 270 on the arm 247 has a slot 318 intersecting the recess 269 adapted to receive the knife when the arm is in its raised position for severing the cords between the staples S. The knife is operated by supplying air under pressure to the cylinder 307 behind the piston 313 through a port 319 (see Fig. 11). A spring for returning the knife to its retracted position is indicated at 320.

Following the intermittent feed rolls 37 and 39, there is provided means indicated at 321 for heat sealing and segmenting the web along transverse lines spaced at bag width intervals and intersecting the notches 109. This means is more particularly illustrated in Figs. 25 and 26 and is shown to comprise a knife 323 cooperable with a roll 325 preferably having a heat-resistant resilient surface. The knife has electrical resistance heating means incorporated therein such as a plurality of standard cartridge type heaters, one of which is indicated at 326 in Fig. 26. The knife has water-cooled end members 327 secured in bearing blocks 329. The roll 325 is journalled at its ends in bearings 331 which are vertically slidable in slots 333 in bearing blocks 334. Springs 335 bias the bearings 331 downward. Cams 337 are fixed on the cam shaft 67. Rods 339 extending down from the bearings 331 carry cam follower rollers 340 at their lower ends engaging the cams. The lower ends of the rods slide in guides 341. The cams are developed and phased to raise the roll 325 into engagement with the edge of the knife 323 and then to lower the roll during the dwell period of the intermittent feed rolls 37 and 39, i.e., when the web 1 is stationary. Upon the upward movement of the roll 325, the web is segmented and simultaneously heat sealed along the segmented edges, thereby to form bags such as illustrated in Fig. 6. The lines of heat sealing are indicated at H and are shown to constitute the sides of the bag. The roll 325 is intermittently rotated by means of a chain and sprocket drive indicated at 343 from the lower intermittent feed roll 37. This varies the part of the roll which contacts the hot knife upon each cycle of operation.

Endless belt conveyor means for carrying away bags segmented and heat sealed by the knife is indicated at 345. The drive for the conveyor means is indicated at 347. This includes a variable speed transmission 349. At 351 (see Fig. 1) is indicated an air pipe positioned to direct a stream of air for blowing the cut ends of the cords from between the knife 323 and the roll 325.

Figure 10:
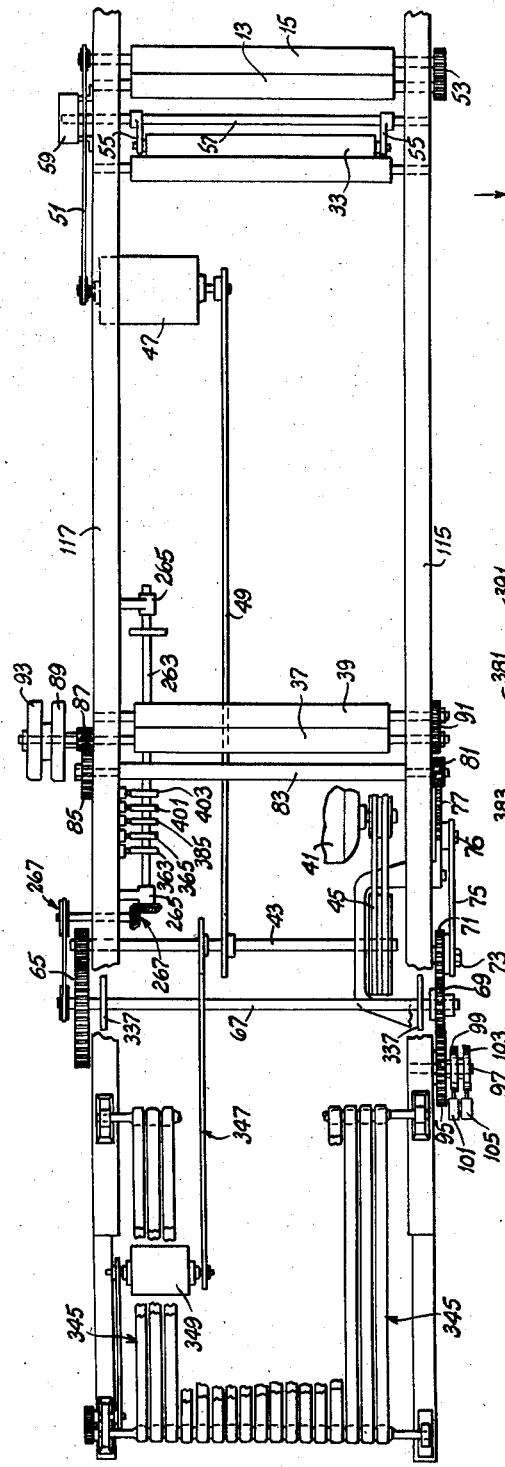
Fig. 10 is a semidiagrammatic plan view developed in a single plane to show certain drive means for the various elements of the apparatus.
Figure 11:
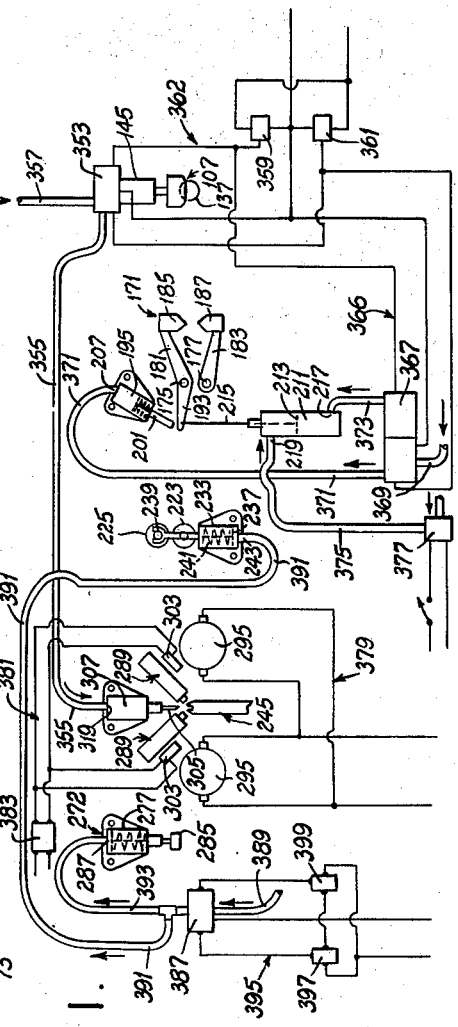
Fig. 11 is a wiring and valve diagram.

Referring to Fig. 11, the air cylinder 145 of the ball punch device 107 is shown to have a solenoid valve 353 mounted thereon for controlling the supply and exhaust of air. This valve 353 is also shown as controlling the supply and exhaust of air for the knife cylinder 307, an air line 355 connecting the valve 353 and the port 319 of the knife cylinder. A line 357 supplies air to the valve 353 from a source of air under pressure (not shown). The solenoid valve 353 is under the control of a pair of switches 359 and 361 in a circuit indicated at 362, the arrangement being such that when the switch 359 is closed and switch 361 is open the ball 137 is driven downward for notching the web, and when switch 361 is closed and switch 359 is open, the ball is retracted. The switches 359 and 361 are actuated by cams 363 and 365 on the shaft 263 (see Fig. 10). When the valve 353 operates to drive the ball downward, it also supplies air through the line 355 to the knife cylinder for operating the knife. The cams 363 and 365 are phased to effect these operations during the dwell interval of the web.

The switches 359 and 361 also control a circuit 366 for a solenoid valve 367 which controls the cylinders 195 and 211 of the hem-sealing device 171. A line for supplying air from the source of air under pressure to the solenoid valve 367 is indicated at 369. An air line 371 leads from the valve 367 to the port 207 of the cylinder 195, and an air line 373 leads from the valve 367 to the port 217 at the lower end of the cylinder 211. When the switch 359 is closed and switch 361 opened, the valve 367 is actuated to supply air to the lower end of the cylinder 211 and vent the cylinder 195 for closing the hem-sealing bars 185 and 187. This occurs during the dwell interval of the web. When the switch 359 opens and the switch 361 is closed, the valve 367 is operated to supply air to the cylinder 195 and vent the lower end of the cylinder 211 to obtain separation of the sealing bars a distance sufficient to allow the web to travel between the bars. This occurs before the rolls 37 and 39 start to feed the web. To separate the sealing bars widely when the apparatus is shut down, there is provided an air line 375 including a solenoid valve 377 connected to the port 219 at the upper end of the cylinder 211. By activating the valve 377 to supply air under pressure to the upper end of the cylinder and venting the lower end of the cylinder 211, the rod 215 may be pulled down to effect wide separation of the sealing bars.

An electrical circuit for the staple-driving motors is indicated generally at 379. An electrical circuit for the clutch-tripping solenoids 303 of the stapling machines 289 is indicated at 381. This includes a switch 383 actuated by a cam 385 on the cam shaft 263. This cam is developed and phased to energize the solenoids 303 for operation of the stapling machines during the dwell intervals of the web.

At 387 is indicated a solenoid valve for controlling the supply of air to and exhaust of air from the air cylinder 233 for the roll 225 and the air cylinder 277 for the cord-clamping means 272. At 389 is indicated an air supply line leading to the solenoid valve 387 from the source of compressed air. At 391 and 393 are indicated air lines leading from the solenoid valve 387 to the cylinders 233 and 277, respectively. At 395 is indicated a circuit for the solenoid valve 387, including two switches 397 and 399. These switches are operated by cams 401 and 403 on the cam shaft 263. The cams are developed and phased so that switch 397 is closed when switch 399 is opened, and vice versa, and the operation is such that air is supplied to the cylinders 233 and 277 during the dwell intervals of the web and somewhat ahead of the operation of the arm 247. In this respect, it will be observed that the rolls 223 and 225 are normally in engagement with one another, but need to be separated during the dwell intervals of the web to allow the cords to be pulled from their supplies while the web is stationary, and the cords need to be clamped by means 272 before operation of the arm 247, so that the loop L may be drawn out by the arm 247.

Operation is as follows:

The apparatus operates through one cycle upon each revolution of the cam shaft 67. During a part of each cycle, the intermittent feed rolls 37 and 39 are driven to feed forward a length of the web 1 corresponding to the desired bag width. During the remainder of each cycle, the intermittent feed rolls 37 and 39 are stationary and the web remains stationary, thus providing the dwell intervals between successive web feeding operations. As the web is fed forward by the intermittent feed rolls, the cords 157 and 161 are fed from the supplies 159 and 163 between the open hem portions 23 and 25 and the walls 5 and 7 of the web. During the forward feeding of the web, the rolls 223 and 225 are clamped on the web to insure forward feeding of the cords with the web. Without these rolls, there may be some tendency for the web to slip on the cords without feeding the cords.

During each dwell interval of the web, the ball punch device 107 is operated to punch a notch 109 in the web. The result is that the web has a series of notches 109 in its margin having the hem portions 23 and 25, with these notches spaced at bag width intervals along the length of the web. The unit 245 is so located that, when the web comes to a stop after each feeding operation, there will be a notch 109 in register with the arm 247 of the unit 245. Simultaneously with the operation of the ball punch device 107, the hem-sealing bars 185, 187 are operated to effect heat sealing of the open hem portions 23 and 25 to the respective walls 5 and 7 of the web. Following the sealing, the bars are retracted so as to permit the web to feed forward during the next operation of the intermittent feed rolls 37 and 39.

Also, during each dwell interval of the web, the roll 225 is separated from the roll 223, and the clamping means 272 is operated to clamp the cords 157 and 161 against the block 275. Following this, the gathering arm 247 swings from its retracted position shown in Fig. 21 to its raised position shown in Figs. 22 and 23. The free end of the gathering arm having the recess 269 enters the notch 109 which is in register with the arm, and moves laterally outward beyond the margin of the web, as shown best in Fig. 24. The portions of the cords exposed in the stated notch 109 are gathered in the recess 269, and the arm draws out the loop L. Since the roll 225 is separated from the roll 223, the cords may slide freely in the hem portions 23 and 25 from the pulleys 153 and 155 to the arm. The arm remains in its raised position for a sufficient length of time, as determined by the development of the cam 261, to give the stapling machines 289 and the knife 305 time to act. The stapling machines are timed to operate after the gathering arm has been swung to its raised position and has thereby drawn the loop L. Upon the operation of the stapling machines, plungers 291 of the machines operate to drive staples S and clinch them around the cords 157 and 161 on opposite sides of the gathering arm 247. The knife 305 is timed to operate after the stapling machines. Figs. 23 and 24 show the staples S clinched around the cords, and the knife 305 in the position it occupies after having severed the cords. From Fig. 24, it will be observed that the loop L is severed between the two points of securement of the cords at the staples S.

Also, during each dwell interval of the web, the roll 325 is raised toward the knife 323 for effecting heat sealing and segmenting of the web along transverse lines spaced at bag width intervals and intersecting the notches 109, thereby to form bags such as illustrated in Fig. 6 with the heat-sealed side seams H. The lines of segmentation intersect the notches 109, and hence the finished bags have what amount to half-notches 109a at the upper corners, the ends of the cords 157 and 161 extending out of the hems at these corners and being secured together by the staples S. Each bag, as segmented by the knife 323, is carried away by the conveyor 345, and this completes the operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In an apparatus for manufacturing draw cord bags from a continuous web of heat sealable material having two superimposed walls joined along one longitudinal edge of the web and having textile cords contained in heat-sealed hem portions extending along the other edge of the web, the web having notches in said hem portions spaced at bag width intervals, the cords extending longitudinally of the web through said hem portions and traversing the notches, means for intermittently feeding forward a length of the web corresponding to the desired bag width, with the web stationary during dwell intervals between successive feeding operations, means operative during said dwell intervals for gathering portions of the cords exposed in a notch and pulling them out of the notch to form a loop including portions of both cords extending out from the notch and severing the loop, and means following the loop-pulling means for holding the cords against rearward movement while the loop-pulling means is operating.

2. Apparatus as set forth in claim 1 further comprising means operative during said dwell intervals for stapling together the portions of the two cords in the loop at two points spaced along the length of the cords and on opposite sides of the point where the loop is severed.

3. In an apparatus for manufacturing draw cord bags from a continuous web of heat sealable material having two superimposed walls joined along one longitudinal edge of the web and having textile cords contained in hem portions extending along the other edge of the web, the web having notches in said hem portions spaced at bag width intervals, the cords extending longitudinally of the web through said hem portions and traversing the notches, means for intermittently feeding forward a length of the web corresponding to the desired bag width, with the web stationary during dwell intervals between successive feeding operations, means preceding the feeding means operative during said dwell intervals for gathering portions of the cords exposed in a notch and pulling them out of the notch to form a loop including portions of both cords extending out from the notch and severing the loop, means following the loop-pulling means for holding the cords against rearward movement while the loop-pulling means is operating, and means following the feeding means for heat sealing and segmenting the web along transverse lines spaced at bag width intervals and intersecting the notches.

4. Apparatus as set forth in claim 3 further comprising means operative during said dwell intervals and prior to the severing of the loop for stapling together the portions of the two cords in the loop at two points spaced along the length of the cords and on opposite sides of the point where the loop is severed.

5. In an apparatus for manufacturing draw cord bags from a web having two superimposed walls joined along one longitudinal edge of the web and having open hem portions on the outside of said walls along the other longitudinal edge, means for intermittently feeding forward a length of the web corresponding to the desired bag width, with the web stationary during dwell intervals between successive feeding operations, means for forming a notch in the margin of the web having the open hem portions during each dwell interval so as to form a series of notches in the web with the notches spaced at bag width intervals, means following the notch-forming means for guiding a first cord from a supply thereof between one open hem portion and the respective wall of the web and for guiding a second cord from a supply thereof between the other open hem portion and the respective wall of the web, means following the guiding means for securing the margins of the open hem portions to the respective walls to form complete tubular hems containing the cords, means following the securing means operative during said dwell intervals for holding the cords against rearward movement, and means located between the securing means and the cord-holding means and operative during said dwell intervals for gathering portions of the cord exposed in a notch and pulling a loop including portions of both cords from the notch and severing the loop.

6. Apparatus as set forth in claim 5 further comprising means operative during said dwell intervals for securing together the portions of the two cords in the loop at two points spaced along the length of the cords and on opposite sides of the point where the loop is severed.

7. In an apparatus for manufacturing draw cord bags from a web of heat sealable material, said web having two superimposed walls joined along one longitudinal edge of the web and having open hem portions on the outside of said walls along the other longitudinal edge, means for intermittently feeding forward a length of the web corresponding to the desired bag width, with the web stationary during dwell intervals between successive feeding operations, means for forming a notch in the margin of the web having the open hem portions during each dwell interval so as to form a series of notches in the web with the notches spaced at bag width intervals, means following the notch-forming means for guiding a first textile cord from a supply thereof between one open hem portion and the respective wall of the web and for guiding a second textile cord from a supply thereof between the other open hem portion and the respective wall of the web, means following the guiding means operative during said dwell intervals for heat sealing the margins of the open hem portions to the respective walls to form complete tubular hems containing the cords, means following the heat-sealing means operative during said dwell intervals for holding the cords against rearward movement and means located between the heat-sealing means and the cord-holding means and operative during said dwell intervals for gathering portions of the cords exposed in a notch and pulling a loop including portions of both cords from the notch and severing the loop.

8. Apparatus as set forth in claim 7 further comprising means operative during said dwell intervals for stapling together the portions of the two cords in the loop at two points spaced along the length of the cords and on opposite sides of the point where the loop is severed.

9. In an apparatus for manufacturing draw cord bags from a web having two superimposed walls joined along one longitudinal edge of the web and having open hem portions on the outside of said walls along the other longitudinal edge, means for intermittently feeding forward a length of the web corresponding to the desired bag width, with the web stationary during dwell intervals between successive feeding operations, means preceding the feeding means for forming a notch in the margin of the web having the open hem portions during each dwell interval so as to form a series of notches in the web with the notches spaced at bag width intervals, means following the notch-forming means for guiding a first cord from a supply thereof between one open hem portion and the respective wall of the web and for guiding a second cord from a supply thereof between the other open hem portion and the respective wall of the web, means following the guiding means for securing the margins of the open hem portions to the respective walls to form complete tubular hems containing the cords, means following the securing means operative during said dwell intervals for holding the cords against rearward movement, means located between the said securing means and the cord-holding means and operative during said intervals for gathering portions of the cord exposed in a notch and pulling a loop including portions of both cords from the notch and severing the loop, and means following the feeding means operative during said dwell intervals for segmenting the web along transverse lines spaced at bag width intervals and intersecting the notches.

10. Apparatus as set forth in claim 9 further comprising means operative during said dwell intervals and prior to the severing of the loop for securing together the portions of the two cords in the loop at two points spaced along the length of the cords and on opposite sides of the point where the loop is severed.

11. In an apparatus for manufacturing draw cord bags from a web of heat sealable material, said web having two superimposed walls joined along one longitudinal edge of the web and having open hem portions on the outside of said walls along the other longitudinal edge, means for intermittently feeding forward a length of the web corresponding to the desired bag width, with the web stationary during dwell intervals between successive feeding operations, means preceding the feeding means for forming a notch in the margin of the web having the open hem portions during each dwell interval so as to form a series of notches in the web with the notches spaced at bag width intervals, means following the notch-forming means for guiding a first textile cord from a supply thereof between one open hem portion and the respective wall of the web and for guiding a second textile cord from a supply thereof between the other open hem portion and the respective wall of the web, means following the guiding means operative during said dwell intervals for heat sealing the margins of the open hem portions to the respective walls to form complete tubular hems containing the cords, means following the heat-sealing means operative during said dwell intervals for holding the cords against rearward movement, means located between the heat-sealing means and the cord-holding means and operative during said dwell intervals for gathering portions of the cords exposed in a notch and pulling a loop including portions of both cords from the notch and severing the loop, and means following the feeding means operative during said dwell intervals for heat sealing and segmenting the web along transverse lines spaced at bag width intervals and intersecting the notches.

12. Apparatus as set forth in claim 11 further comprising means operative during said dwell intervals and prior to the severing of the loop for stapling together the portions of the two cords in the loop at two points spaced along the length of the cords and on opposite sides of the point where the loop is severed.

13. Apparatus as set forth in claim 11 further comprising means preceding said loop pulling and severing means operative during the feed intervals for clamping the cords to the web to insure feeding of the cords with the webs, said clamping means being released during said dwell intervals.

14. Apparatus as set forth in claim 13 wherein said clamping means comprises a pair of rolls on opposite sides of the web, one roll being movable toward and away from the other, and means for moving said one roll toward and away from the other.

15. In an apparatus for manufacturing draw cord bags from a continuous web having two superimposed walls joined along one longitudinal edge of the web and having cords contained in hem portions extending along the other edge of the web, the web having notches in said hem portions spaced at bag width intervals, the cords traversing the notches, means for intermittently feeding forward a length of the web corresponding to the desired bag width, with the web stationary during dwell intervals between successive feeding operations, an anvil mounted for movement through a notch during said dwell intervals and shaped to gather portions of the cords exposed in a notch and pull a loop including portions of both cords from the notch, a pair of stapling devices cooperable with the anvil for stapling together the two cords in the loop at points spaced along the length of the cords, and a knife cooperable with the anvil for severing the cords in the loop between staples.

16. Apparatus for manufacturing draw cord bags from a continuous web of heat-sealable material having two superimposed walls joined along one edge of the web and having cords contained in hem portions on each wall extending along the other edge of the web, said cords extending from supplies thereof, comprising means for intermittently feeding forward a length of the web corresponding to the desired bag width, the web being stationary during dwell intervals between successive feeding operations, means operative during said dwell intervals for drawing out portions of both cords through openings in said hem portions to form a loop including portions of both cords extending out from said hem portions, said loop-forming means acting to pull the cords through the hem portions to obtain from said supplies the cord lengths needed to form the loop, means operative during said dwell intervals for securing together the portions of the two cords in the loop, means operative during said dwell intervals for severing the portions of the two cords in the loop at a point such that the cord ends on one side of the point of severance remain secured together and the cord ends on the other side of the point of severance remain secured together, and means located forward of said loop-forming means and said cord securing and severing means with respect to the direction of web feed and operative during said dwell intervals for heat-sealing and segmenting the web on transverse lines spaced at bag width intervals and intersecting said openings.

17. Apparatus as set forth in claim 16 wherein said cord securing means comprises stapling means operable to apply staples to the loop at two points spaced along the length of the cords, the cords being severed between the staples.

18. Apparatus as set forth in claim 16 further comprising means located forward of said loop-forming means with respect to the direction of web feed for holding said cords against rearward movement while the loop-forming means is operating.

19. Apparatus as set forth in claim 18 wherein said cord securing means comprises two staplers operable to apply staples to the loop at two points spaced along the length of the cords, the cords being severed between the staples.

20. Apparatus as set forth in claim 19 wherein the loop-forming means constitutes an anvil with which the staplers are cooperable.

21. Apparatus for manufacturing draw cord bags from a continuous web of heat-sealable material having two superimposed walls joined along one edge of the web and having cords contained in hem portions on each wall extending along the other edge of the web, said cords extending from supplies thereof, comprising means for intermittently feeding forward a length of the web corresponding to the desired bag width, the web being fed in a predetermined path and being stationary during dwell intervals between successive feeding operations, means located at a first station along said path adjacent said other edge of the web operative during said dwell intervals for drawing out portions of both cords through openings in said hem portions to form a loop including portions of both cords extending out from said hem portions, said loop-forming means acting to pull the cords through the hem portions to obtain from said supplies the cord lengths needed to form the loop, means associated with said loop-forming means at said first station operative during said dwell intervals for substantially simultaneously securing together the portions of the two cords in the loop at two points spaced along the length of the cords and for severing the cords between the two points of securement, and means located at a second station along said path operative during said dwell intervals for heat-sealing and segmenting the web on transverse lines spaced at bag width intervals, said second station being spaced forward of said first station a distance such that said transverse lines intersect said openings.

22. Apparatus as set forth in claim 21 wherein said cord securing means comprises stapling means operable to apply staples to the loop at said two points.

23. Apparatus as set forth in claim 21 further comprising means located between said first and second stations for holding said cords against rearward movement while the loop-forming means is operating.

24. Apparatus as set forth in claim 23 wherein said cord securing and severing means comprises two staplers operable to apply staples to the loop at said two points, and a knife for severing the cords between the two staples.

25. Apparatus as set forth in claim 24 wherein the said loop-forming means constitutes an anvil with which the staplers and knife are cooperable.

References Cited in the file of this patent
UNITED STATES PATENTS

| | | |
|---|---|---|
| 544,197 | Staples | Aug. 6, 1895 |
| 1,920,823 | West | Aug. 1, 1933 |
| 1,920,824 | West | Aug. 1, 1933 |
| 2,334,256 | Eaton | Nov. 16, 1943 |
| 2,656,769 | Hultkrans | Oct. 27, 1953 |
| 2,777,491 | Ashton et al. | Jan. 15, 1957 |